UNITED STATES PATENT OFFICE.

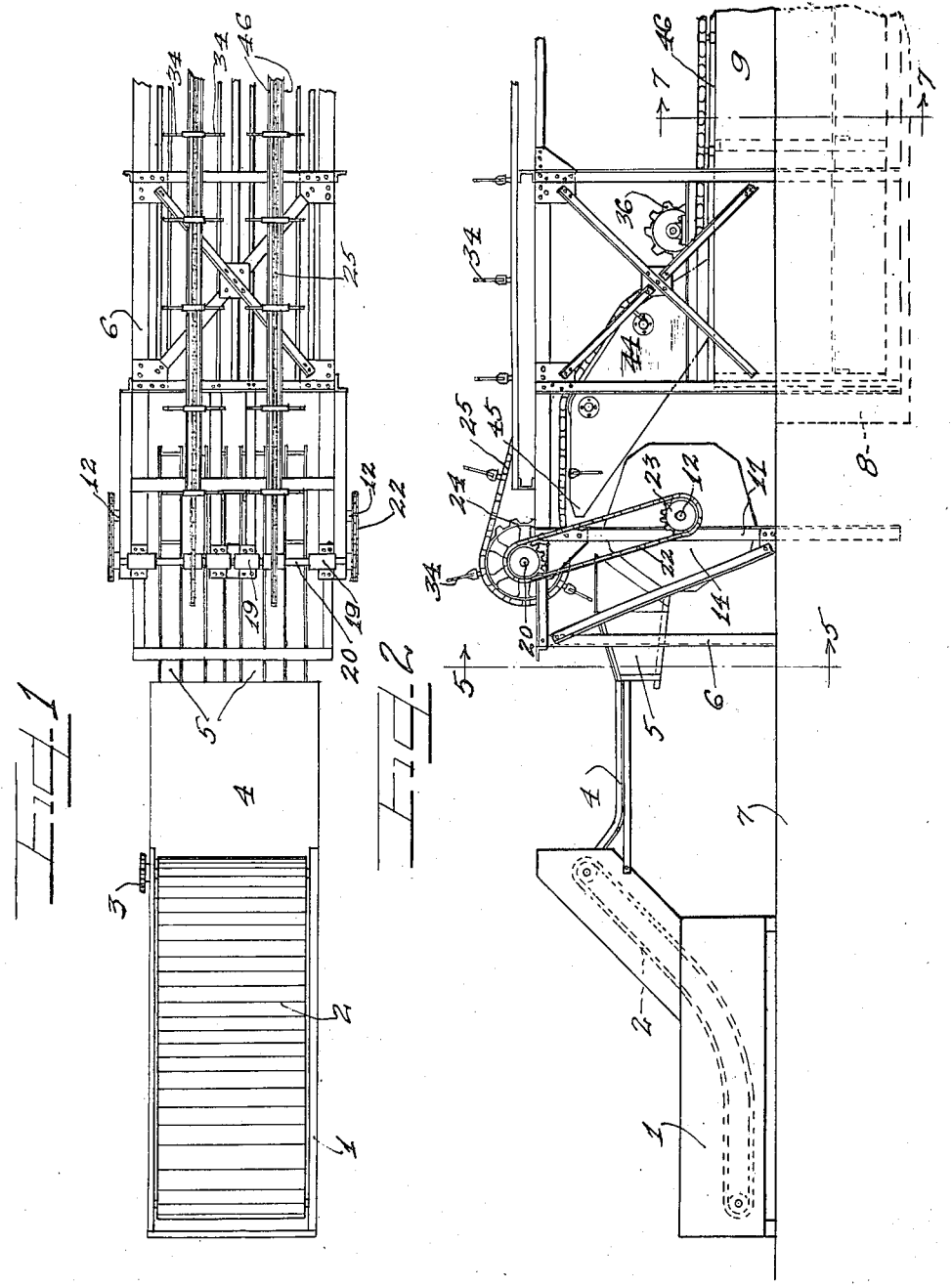

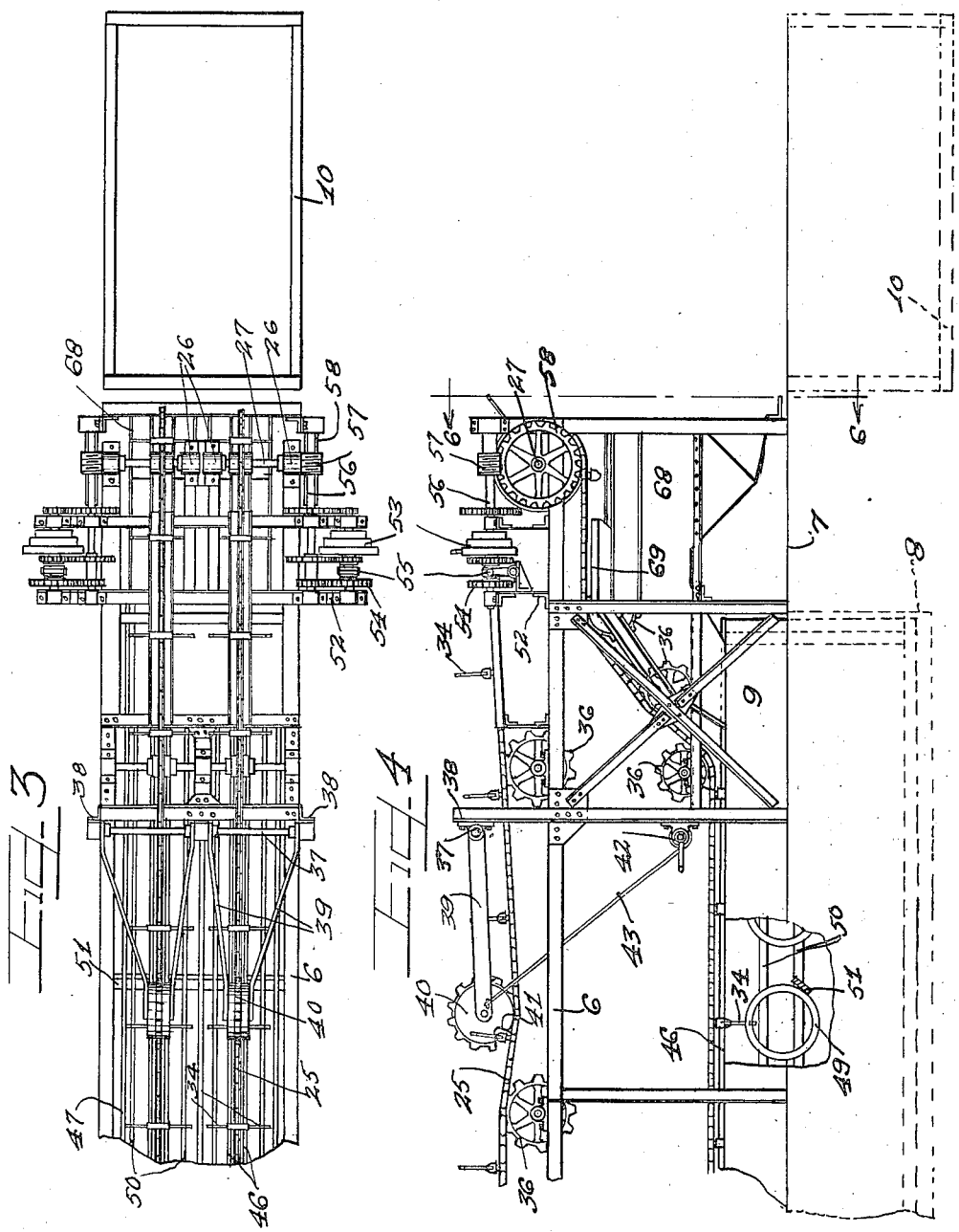

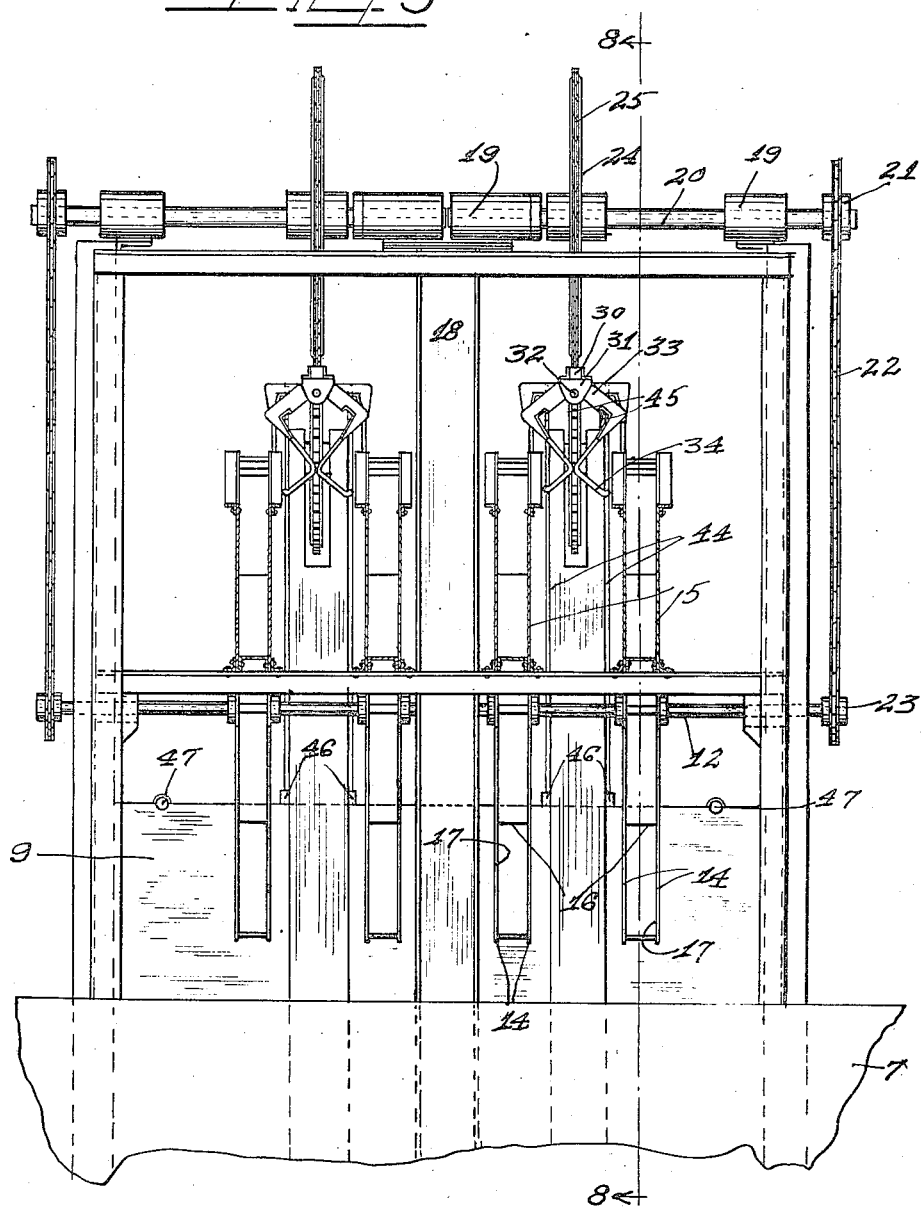

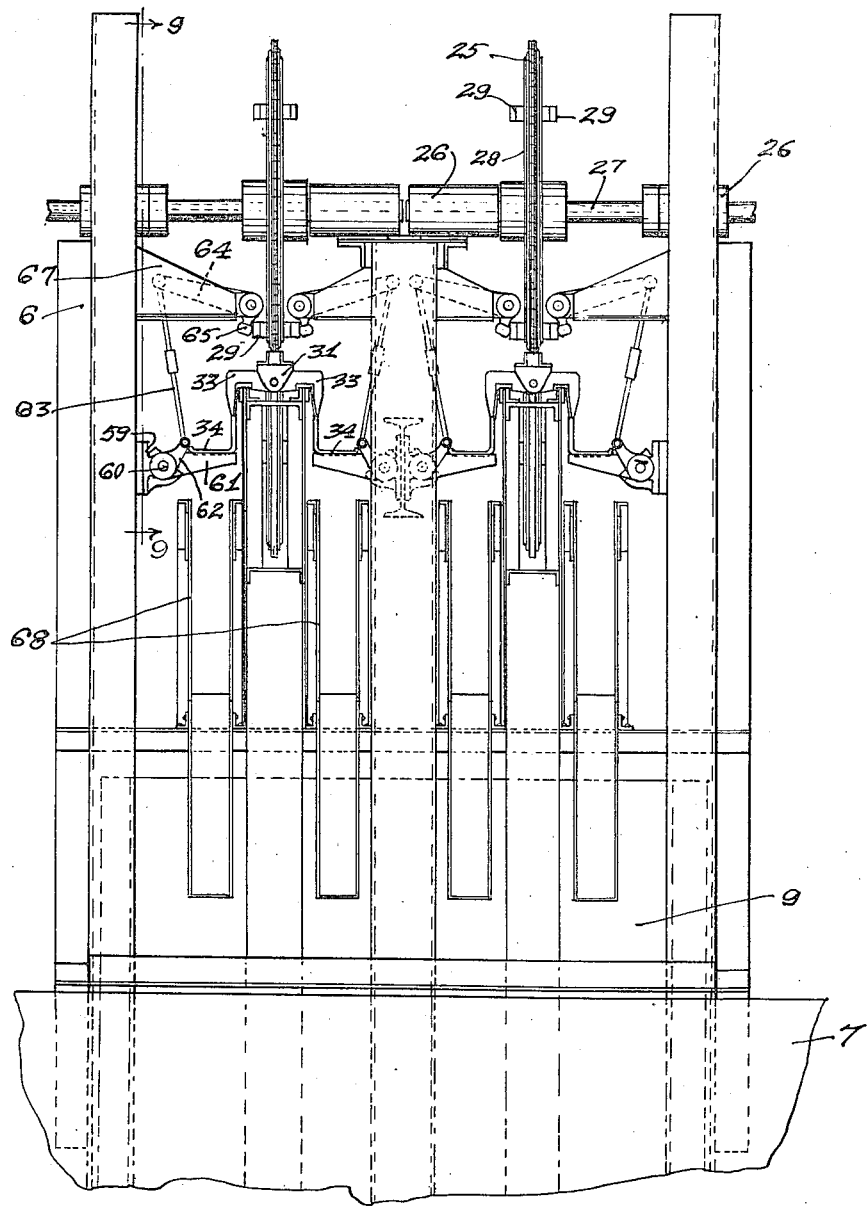

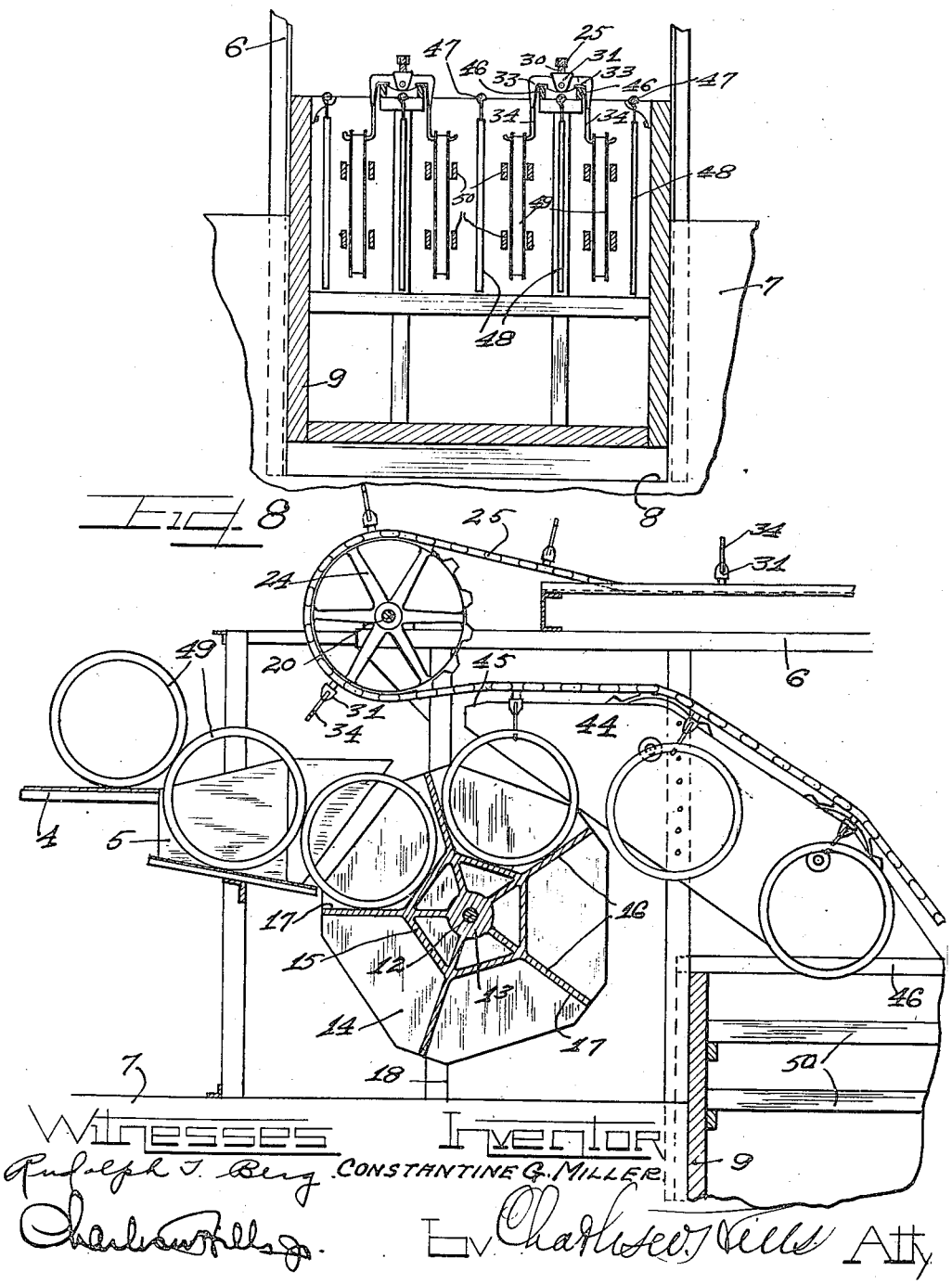

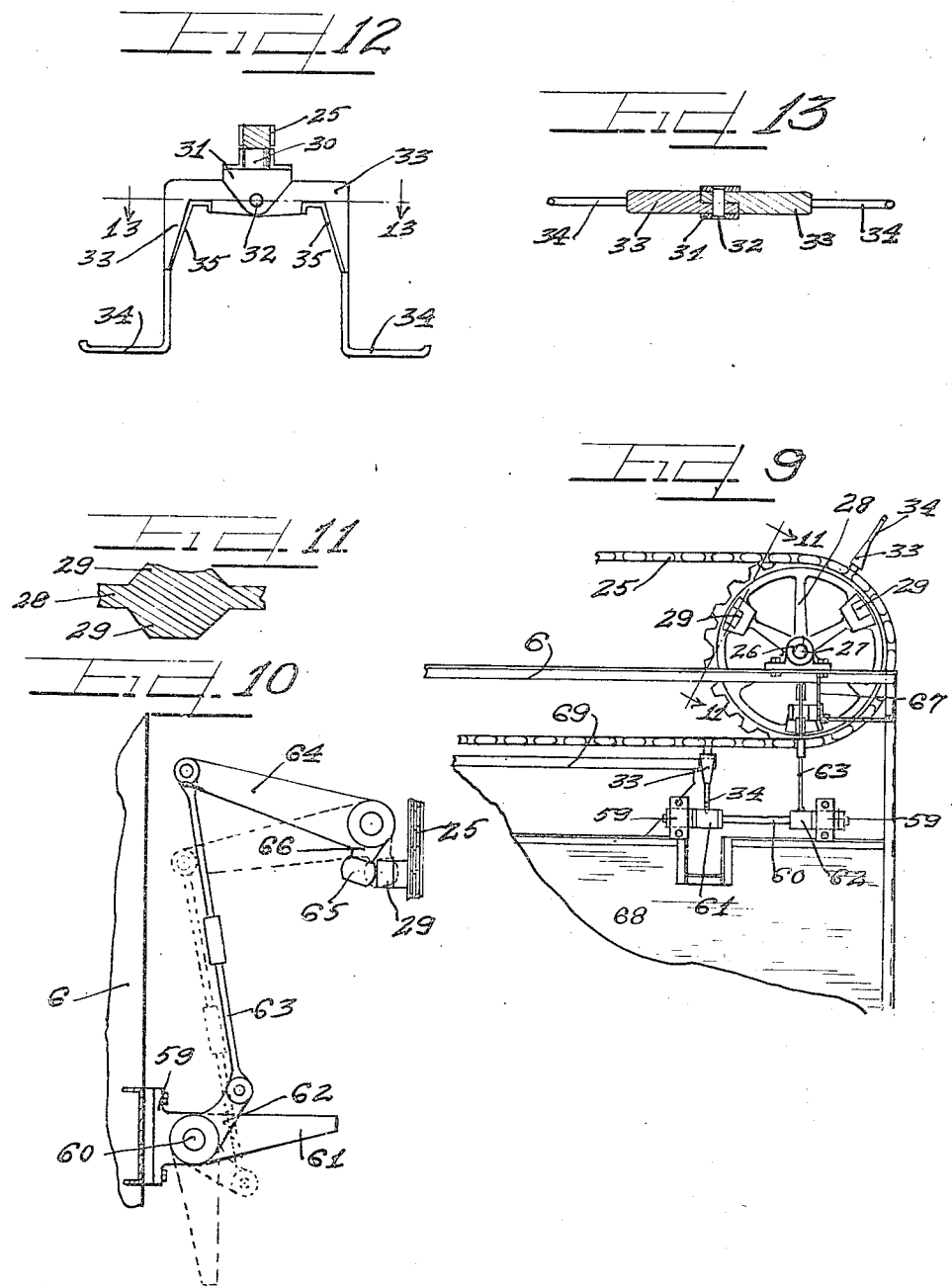

CONSTANTINE G. MILLER, OF CHICAGO, ILLINOIS, ASSIGNOR TO MEAKER GALVANIZING COMPANY, OF CHICAGO, ILLINOIS, A CORPORATION OF ILLINOIS.

ELECTROGALVANIZING-MACHINE.

1,375,309.                    Specification of Letters Patent.        Patented Apr. 19, 1921.

Application filed February 3, 1920.   Serial No. 356,066.

*To all whom it may concern:*

Be it known that I, CONSTANTINE G. MILLER, a citizen of the United States, and a resident of the city of Chicago, in the county of Cook and State of Illinois, have invented certain new and useful Improvements in Electrogalvanizing-Machines; and I do hereby declare that the following is a full, clear, and exact description of the same, reference being had to the accompanying drawings, and to the numerals of reference marked thereon, which form a part of this specification.

This invention relates to an improved type of an electro galvanizing machine adapted for galvanizing automobile rims, felly bands, tire carriers and similar articles, which, after being washed, are fed automatically to a hook carrying conveyer which acts to carry the rims through a galvanizing solution and then automatically discharge the rims into a rinsing tank.

It is an object of this invention to provide an electro galvanizing machine adapted to automatically feed articles into a galvanizing solution and then automatically discharge the articles.

It is also an object of the invention to provide an improved feeding mechanism for a galvanizing machine.

Another object of this invention is to provide an improved discharge mechanism for an electro galvanizing machine.

A further object of the invention is the construction of a galvanizing machine wherein an endless conveyer is synchronized with a rotatable feeding wheel to permit articles to be galvanized to be automatically fed by said wheel to hooked supporting members carried by the conveyer.

It is a further object of this invention to provide a galvanizing machine constructed to automatically feed and carry articles through a galvanizing solution in circuit with stationary cathodes and anodes, and then automatically discharge the articles after they have been completely galvanized on both the interior and exterior surfaces thereof.

It is furthermore an object of the invention to provide a galvanizing machine wherein gravity acting hooks carried by an endless conveyer are adapted to automatically engage and lift articles from a feed wheel and then carry the articles through an electrolytic solution to completely galvanize the articles, said articles during their progress through the machine at intervals contacting obstructions to cause elevation of the articles from the supporting hooks to permit the hooks to change their hold on the articles so that all parts of the articles may be galvanized.

It is an important object of this invention to provide an electrolytic galvanizing machine for automobile rims and the like, said machine having means constructed to automatically pick up and carry rims through an electrolyte and into engagement with a cam actuated device adapted to automatically cause said carrying means to release the rims to permit discharge thereof into a rinsing solution.

Other and further important objects of this invention will be apparent from the disclosures in the specification and drawings.

The invention (in a preferred form) is illustrated in the drawings and hereinafter more fully described.

On the drawings:

Figure 1 is a top plan view of the loading end of the galvanizing machine.

Fig. 2 is a side elevation thereof.

Fig. 3 is a top plan view of the unloading or discharge end of the machine.

Fig. 4 is a side elevation thereof showing part of the electrolytic tank broken away.

Fig. 5 is an enlarged sectional view taken on line 5—5, of Fig. 2.

Fig. 6 is an enlarged end view taken on line 6—6, of Fig. 4.

Fig. 7 is an enlarged detail section taken on line 7—7, of Fig. 2.

Fig. 8 is a sectional view taken on line 8—8, of Fig. 5.

Fig. 9 is a fragmentary sectional view taken on line 9—9, of Fig. 6.

Fig. 10 is an enlarged elevation of one of the cam actuated ejecting mechanisms.

Fig. 11 is a fragmentary detail taken on line 11—11, of Fig. 9.

Fig. 12 is an enlarged elevation of one of the conveyer hook mechanisms.

Fig. 13 is a section taken on line 13—13, of Fig. 12.

As shown on the drawings:

The reference numeral 1, indicates a water tank which is located at the loading end of the galvanizing machine. The water tank 1, is provided with an endless conveyer 2, which is adapted to be driven by any suitable source of power through a sprocket wheel 3, mounted at one end of the upper conveyer shaft.

Connected with the water tank is one end of a loading platform 4, which is positioned to conveniently receive from a conveyer 2, automobile rims or similar articles to be galvanized. The other end of the loading platform 4, is rigidly connected with the front ends of a plurality of guide chutes 5, which are securely mounted at the intake or entrance end of a long supporting frame 6. The frame 6, is preferably constructed of angle irons and channels, and is supported on the floor or ground 7, longitudinally over a pit 8. Seated in the pit 8, is a long galvanizing tank or trough 9, which holds the electrolyte or galvanizing solution. The galvanizing tank 9, projects above the level of the floor between the frame uprights. A second pit is provided in the floor 7, at the rear or unloading end of the frame 6, and engaged in said pit is a hot water rinsing tank 10.

As clearly shown in Figs. 1, 3 and 5, the machine really embraces two duplicate machines each adapted to be independently operated but both mounted on the frame 6, for coaction with the galvanizing tank 9.

Journaled on the frame uprights 11 and 18, is a transverse shaft 12, having keyed or otherwise secured thereon a plurality of feeding or loading drums or wheels, one for each of the guide chutes 5. Each loading wheel comprises a hub 13, side plates 14, a spider 15, and a plurality of radial partitions or ribs 16, which afford pockets or chambers 17, for receiving rims to be galvanized.

Secured upon the top of the frame 6, are a plurality of bearings 19, for rotatably supporting a transverse shaft 20. A sprocket wheel 21, is secured on the outer projecting end of the shaft 20, and trained around said sprocket wheel is an endless chain 22. The chain 22, is also trained around a sprocket wheel 23, secured on the projecting end of the transverse shaft 12. Keyed or otherwise secured on the shaft 20, is a large conveyer sprocket wheel 24, around which a conveyer chain 25, is trained. The conveyer chain 25, extends longitudinally of the machine and is adapted for conveying articles through the galvanizing solution as hereinafter more fully described. Journaled in bearings 26, at the discharge end of the machine is a transverse shaft 27, on which is keyed another large conveyer sprocket wheel 28, around which the conveyer chain 25, is engaged. Integrally formed at spaced intervals on each side of the felly of the sprocket wheel 28, are a plurality of cams 29, Connected by bolts or pins 30, at spaced intervals to the conveyer chain 25, are a plurality of rim or article carrying devices shown in detail in Figs. 12 and 13, and each comprising a channel head 31, provided with a transverse pin 32, on which are pivotally mounted oppositely disposed right angle bracket arms or shoes 33. Formed or secured on the free end of each of the bracket arms 33, is an outwardly directed hook 34. When the rim carrying devices are directed downwardly the hooks 34, move inwardly toward one another by gravity about the pivot pins 37, as shown in Fig. 5, into a position ready for loading. The bracket arms 33, are beveled at their inner edges as denoted by the reference numeral 35. Rotatably mounted at various places on the frame 6, and in the plane of the conveyer chain 25, are a plurality of guide sprocket wheels 36, which permit the conveyer chain 25, to follow a tortuous path through the machine.

For the purpose of tensioning the conveyer chain 25, or keeping the same taut a transverse shaft 37, is supported on frame uprights 38, near the discharge end of the machine. Pivoted on said shaft 37, are two arms 39, which are bent toward each other and rotatably support a mutilated sprocket wheel 40, provided with a recess or notch 41, to permit the sprocket wheel 40, to engage over the supporting heads 31, of the hook carrying devices, as shown in Fig. 4. Mounted on the frame 6, below the shaft 37, is a pawl and ratchet device 42, controlling a cable 43, which is connected to one of the arms 39, thereby causing the multilated sprocket wheel 40, to be held in engagement with the conveyer chain 25, to take up slack in said chain.

Mounted on the intake end of the tank 9, are a pair of inclined guide plates 44, the upper end of each of which is tapered to form an actuating finger 45, adapted to engage a bracket arm 33, and elevate the same and the hook 34, attached thereto, whereby rims may be automatically removed from the feed wheels and conveyed by the chain 25, into the tank 9.

After the hook members 33—34, have been raised by the plate fingers 45, into an extended or carrying position, as shown in Figs. 7 and 12, said hook members, as they are conveyed along by the chain 25, ride on the upper edges of the guide plates 44, downwardly toward the intake end of the tank 9. Upon leaving the guide plates 44, the arm brackets 33, engage over a pair of spaced parallel bus bars 46, which form cathodes. The bus bars 46, are mounted longitudinally on the top of the tank 9. Mounted longitudinally on top of the tank 9, between the bus bars 46, and on each side of the bus bars, are rods 47, from which are suspended at intervals a plurality of anode bars 48, which project into the electrolyte within the tank 9. The bus bars or cathodes 46, are connected with one pole of an electric generator (not shown) while the anode supporting rods 47, are connected with the other pole of said generator.

The rims or articles to be galvanized are indicated by the reference numeral 49. For guiding the rims through the tank 9, a plurality of pairs of spaced guide rails 50, are mounted longitudinally in said tank 9, as shown in Figs. 7 and 8. Secured at intervals across the interior of the tank 9, are transverse inclined bars 51, which are positioned in the path of the rims 49, to cause said rims to be temporarily elevated during their progress through the tank to permit the supporting hooks 34, to change their hold on said rims so that all parts of the rims may be thoroughly galvanized.

Supported on an auxiliary frame 52, at the rear or unloading end of the galvanizing machine is a rotatable cone pulley 53, adapted to be driven by a belt from any suitable source of power. A speed change gear mechanism 54, and a shifting clutch device 55, are also supported on the auxiliary frame 52, for co-action with the cone pulley 53, for driving a shaft 56, journaled on the auxiliary frame 52. Secured on the shaft 56, is a worm 57, which meshes with a worm wheel 58, engaged on the outer end of the driving shaft 27. An automatic unloading mechanism is provided at the rear or unloading end of the machine, as shown in Figs. 6 and 10, to co-act with the cams 29, on the conveyer sprocket wheels 28. Secured on the frame 6, are bearings 59, in which a shaft 60, is journaled. Secured on one end of the shaft 60, is a U-shaped or two arm member 61. Engaged on the other end of the shaft 60, is a crank 62, to the end of which is pivotally connected the lower end of a connecting rod 63. The upper end of the connecting rod 63, is pivotally connected to the end of a long bell crank arm 64. A head 65, is formed on the short bell crank arm 66, for co-action with the cams 29, on the sprocket wheel 28. The bell crank is pivotally supported on a bracket 67, attached to the frame 6. Normally the automatic unloading mechanism takes the position shown in dotted lines in Fig. 10. Discharge chutes 68, are mounted at the unloading end of the frame 6, for receiving the galvanized rims 49, as they are released by the hooks 34. The discharge chutes 68, are open at the end to permit the rims 49, deposited therein to roll therefrom into the rinsing tank 10.

The operation is as follows:

The articles to be galvanized, which in this case are automobile rims 49, are first deposited in the water tank 1. From the tank 1, the rims 49, are carried upwardly by the conveyer 2, and deposited upon the loading platform 4. From the platform 4, the rims may be manually or automatically fed into the pockets 17, of the intake chutes 5, in a vertical position, as shown in Fig. 8.

The conveyer chains 25, are adapted to be independently operated at the same or at different speeds, since each chain is provided with a separate driving mechanism. The machine is of a duplex type. The operation will relate to one side of the machine only since both sides are similarly operated and controlled. The driving belt engaged on the driving cone pulley 53, is rotated from a suitable source of power, and causes rotation of the pulley shaft. The clutch 55, is shifted to connect up certain of the speed change gears 54, to cause a drive to be transmitted through the shaft 56 and the worm 57, to the worm wheel 58, on the shaft 27. The shaft 27, is thereby rotated and causes operation of the chain sprocket wheel 28, and the conveyer chain 25, engaged therewith. The chain is thus operated and acts to rotate the sprocket wheel 24 and the shaft 20. The drive from the shaft 20, is transmitted to the shaft 12, by means of the chain 22 and the sprocket wheels 21 and 23. Rotation of the shaft 12, causes rotation of the feed wheels or drums, which are synchronized with the conveyer chain 25, to permit the hook devices on the conveyer chain to properly co-act with the feed drums.

As the feeding drums are rotated the rims 49, from the chutes 5, automatically roll into the drum pockets 17, as shown in Fig. 8. As the hook mechanism rounds the bight at the loading end of the machine, the arms or shoes 33, move inwardly by gravity toward one another so that the hooks 34, contact each other as disclosed in Fig. 5. As the hook mechanism is conveyed or moves toward the intake end of the tank 9, the taper fingers or ends 45, of the guide plates 44, engage in the inner bend of said shoes 33, so that with the advance of the conveyer chain 25, the shoes 33, are automatically swung upwardly away from each other and ride upwardly over the upper edges of the guide plates 44, holding the hook mechanism in supporting position as shown in Fig. 12. The movement of the loading drums 14, is synchronized with the movement of the hook mechanisms so that as the hooks 34, of a hook mechanism are moved apart the hooks 34, automatically engage two of the rims 49, and remove said rims out of the loading drums, as the conveyer chain 25, advances. The rims are thus automatically fed into the machine and carried by means of the conveyer chain down into the electrolytic solution within the tank 9.

As a hook mechanism reaches the upper portion of the entrance end of the tank 9, the shoes 33, slide from the guide plates 44, onto the bus bars 46, and the rims 49, enter the tank between the guide bars 50, as shown in Fig. 7. As the shoes 33, engage the bus bars 46, the rims 49, become part of the cathodes. During the progress of the rims through the machine the rims pass between the suspended anodes 48, and due to the electrolytic action set up in the solution the rims are gradually and evenly plated or galvanized by the material of which the anode bars 48, are constructed. At intervals during the progress of the rims 49, through the tank 9, the rims contact the inclined cross bars 51, shown in Fig. 4, and are slightly elevated and rolled to cause the same to shift on the hooks 34, so that all parts of the rims may be galvanized.

When the rims near the discharge end of the tank 9, the chain 25 carries the rims upwardly out of the tank. The rims upon leaving the electrolytic solution drain themselves as they approach the automatic unloading or discharge mechanism. Normally the unloading mechanisms are positioned as shown in dotted lines in Fig. 10. As the galvanized rims approach the double arm members 61, a pair of the cams 29, are moved into engagement with the bell-crank heads 65, and thereby swing the bell-cranks into the full line position of Fig. 10. Upward movement of the crank arms 64, actuates the connecting rods 63 and the cranks 62, causing rotation of the shafts 60, and upward movement of the double arm members 61. As the double arm members 61, swing upwardly they engage the rims 49, and slightly lift the same off of the hooks 34. At this point in the progress of the rims, the hook carrying shoes 33, clear the end of guide rails 69, and automatically drop into normal position out of engagement with the rims 49. The rims are temporarily supported by the arm members 61. As soon as the cams pass the bell-crank heads 65, the discharging mechanisms drop back automatically into normal position, thereby causing the arms 61, to release the rims 49, which drop into the discharge chutes 68, and roll into the rinsing tank 10.

I am aware that numerous details of construction may be varied through a wide range without departing from the principles of this invention, and I therefore do not purpose limiting the patent granted otherwise than necessitated by the prior art.

I claim as my invention:

1. In a galvanizing machine the combination with a tank of electrolytic solution, stationary cathodes and anodes supported by said tank, an endless mechanism for carrying articles to be galvanized through the solution in said tank, means for automatically feeding articles to said mechanism, inclined bars disposed transversely in said tank adapted to intermittently elevate the articles to permit the hold on said articles to be changed, and means for automatically unloading the articles from said mechanism after the articles have been galvanized.

2. In a galvanizing machine for plating articles on all surfaces, a tank of electrolytic solution, stationary cathode bars supported on said tank above the solution, stationary anodes projecting into the solution, and means slidable on said cathode bars for carrying articles through the solution between said anodes.

3. In a machine for galvanizing articles, a tank of electrolytic solution, stationary bus bars supported longitudinally on said tank above the solution, anodes suspended to project into said solution, means slidable on said bus bars for carrying articles through the solution between said anodes, means for automatically feeding the articles to said carrying means, and means for automatically removing the articles from said carrying means after the articles have passed through the solution.

4. In a galvanizing machine, a tank of electrolytic solution, an endless conveyer thereabove, hook members pivotally mounted thereon in pairs, and means for automatically actuating said hook members whereby articles are engaged by said hook members to permit the conveyer to carry the articles through the electrolytic solution in said tank.

5. In a galvanizing machine, a tank of electrolytic solution, an endless conveyer thereabove, adjustable hook members carried thereby, a rotatable article feeding means synchronized with the movement of said hook members, and means for automatically adjusting said hook members to cause the same to automatically engage and remove articles from said feeding means and carry the articles through the electrolytic solution.

6. In a galvanizing machine, a tank of electrolytic solution, an endless conveyer thereabove, adjustable hook members carried thereby, a rotatable article feeding means synchronized with the movement of said hook members, guide chutes for guiding articles into said feeding means, and means for automatically actuating said hook members at a predetermined time to cause the hook members to automatically engage and remove articles from said feeding means and carry the articles through the electrolytic solution.

7. A galvanizing machine comprising a frame, a washing tank at one end thereof, a loading platform connected therewith, a conveyer in said washing tank for carrying articles to said platform, a rotatable article feeding means on said frame, a chute on said frame to guide articles from said platform into said feeding means, a tank of electrolytic solution below said frame, an endless conveyer on said frame above said tank of electrolytic solution, gravity acting hook members on said endless conveyer, means for automatically adjusting said hook members to cause the same to automatically engage and remove articles from said rotatable feeding means and carry the articles through the electrolytic solution, means on said frame for automatically unloading the articles from said hook members, and a rinsing tank at the unloading end of said frame for receiving the discharged articles.

8. A galvanizing machine comprising a galvanizing tank, an endless conveyer thereabove, means for driving the same, gravity acting hook members adjustably supported at intervals on said endless conveyer, a rotatable article feeding device also adapted to be operated by said driving means, and means for automatically actuating said hook members to cause the same to automatically engage and remove articles from said rotatable feeding device and convey the articles through the galvanizing tank.

9. The combination with an electrolytic galvanizing machine, of a rotatable wheel for feeding articles to the machine.

10. The combination with an electrolytic galvanizing machine, of a pocketed article carrying wheel, and means for operating the machine and rotating said wheel to cause the articles to be fed to said machine.

11. In a plating machine, a tank of electrolytic solution, an endless conveyer, hook members on said conveyer, a rotatable feed wheel for feeding articles into the machine, guide plates on said machine tapered at one end for engaging and automatically operating said hook members to cause the hook members to engage and remove articles from said feed wheel and carry the articles through the electrolytic solution.

12. The combination with a galvanizing machine, of means for carrying articles through the machine, and means in said machine for intermittently elevating the articles during the progress through the machine to permit the carrying means to change holds on said articles.

13. In a galvanizing machine the combination with means for carrying articles through the machine, of members disposed at intervals in said machine adapted to intermittently elevate said articles during their progress through the machine to permit the carrying means to change holds on the articles.

14. In a galvanizing machine the combination with an endless conveyer chain, of pairs of oppositely disposed gravity acting article carrying members pivotally supported at intervals transversely thereon.

15. In a galvanizing machine the combination with an endless conveyer chain, of channel members carried thereby, angle arms pivotally connected with said channel members, and article carrying hooks on said angle arms.

16. In a galvanizing machine the combination with a tank of electrolytic solution, of cathode bars mounted longitudinally on said tank, rods mounted longitudinally of said tank between and on opposite sides of said cathode bars, anodes suspended from said rods and projecting into the electrolytic solution, a conveyer above said tank, means for operating the conveyer, gravity acting hook members pivotally connected with said conveyer for carrying articles through the machine, and means for automatically adjusting said hook members and guiding the same onto said cathode bars to permit the articles to be conveyed through the electrolytic solution between said anodes.

17. In a galvanizing machine the combination with a tank of electrolytic solution, of cathode bars mounted longitudinally on said tank, rods mounted longitudinally on said tank between and on opposite sides of said cathode bars, anodes suspended from said rods and projecting into the electrolytic solution, a conveyer above said tank, means for operating the same, gravity acting hook members pivotally connected with said conveyer, rotatable means for feeding articles to the machine, guide plates mounted on said tank adapted to operate said hook members to cause the same to automatically engage and remove articles from said rotatable means, said guide plates adapted to guide said hook members onto said cathode bars to permit the articles to be conveyed through the electrolytic solution between said anodes, and cam actuated means for automatically discharging the galvanized articles as they emerge from the tank.

18. The combination with a galvanizing machine, of cam actuated means for automatically unloading galvanized articles from the machine.

19. The combination with a galvanizing machine, of means for automatically unloading galvanized articles from the machine, and a cam mechanism for actuating said unloading means.

20. A galvanizing machine comprising a tank of electrolytic solution, sprocket wheels mounted above said tank, a conveyer chain trained around said sprocket wheels, hooks on said conveyer chain, means for automatically loading articles onto said hooks to be conveyed through the electrolytic solution by said conveyer chain, means for automatically lifting the articles from said hooks after the articles leave said tank, and cam members on one of said sprocket wheels adapted to operate said means.

21. A galvanizing machine comprising a tank of electrolytic solution, a frame thereabove, sprocket wheels rotatably mounted on said frame, means for driving one of said sprocket wheels, cams formed on said driven sprocket wheel, an endless chain trained around said sprocket wheels, adjustable hook members on said chain, a rotatable feed wheel mounted on said frame adapted to be driven from said driving means, guide plates for actuating said hook members to cause the hook members to automatically engage and remove articles from said rotatable feed wheel for conveyance through the electrolytic solution, discharging arms mounted on said frame, and a crank mechanism connected with said arms, said crank mechanism adapted to be operated by the cams on the driven sprocket wheel to cause said arms to automatically lift the galvanized articles from said hook members and then discharge the articles from the machine.

22. In an electrolytic galvanizing machine the combination with a galvanizing tank, of an endless conveyer provided with rim carrying members, sprocket wheels for supporting and operating said endless conveyer, cams formed on one of said sprocket wheels, a shaft, discharge arms secured thereon, a crank also secured on said shaft, a pivoted bell-crank, a rod connecting said crank with said bell-crank, and a head formed on said bell-crank adapted to be actuated by said cams to cause said discharge arms to automatically remove galvanized rims from said rim carrying members and then discharge said rims.

23. In a galvanizing machine the combination with means for conveying articles through the machine, of crank operated members, and cam means for operating said crank operated members to cause the same to automatically remove articles from said carrying means, said crank operated members adapted when released by said cam means to automatically return to normal position to cause discharge of the articles from the machine.

24. In a galvanizing machine, the combination with a frame, of an endless article conveyer thereon, means for taking up slack in said conveyer, said means comprising a pair of arms pivotally mounted on said frame, sprocket wheels on said arms and engaged with said conveyer, and a mechanism for adjusting said arms and sprocket wheels to cause tensioning of the conveyer to take up slack therein.

25. The combination with a galvanizing machine, of an endless conveyer for carrying articles through the machine, rotatable sprocket wheels in mesh with said endless conveyer, means for adjusting the same for a mechanism at one end of said machine for automatically loading articles onto said conveyer, and a second mechanism at the other end of said machine adapted to automatically unload the articles from said conveyer.

26. In a galvanizing machine the combination with an endless conveyer for carrying articles through the machine, of a wheel for driving said conveyer, a discharge mechanism, and cam means on said wheel for automatically operating said discharge mechanism to cause automatic removal of said articles from said conveyer.

27. The combination with an electrolytic galvanizing machine, of an article feeding device comprising a hub, side plates integral therewith, and a plurality of radial partitions dividing the feeding device into article holding chambers.

In testimony whereof I have hereunto subscribed my name in the presence of two subscribing witnesses.

CONSTANTINE G. MILLER.

Witnesses:
EARL M. HARDINE,
FRED E. PAESLER.